United States Patent
Yuan et al.

(10) Patent No.: US 12,353,788 B2
(45) Date of Patent: Jul. 8, 2025

(54) SOC MODULE FOR AUDIO DATA TRANSMISSION AND AUDIO TRANSMISSION SYSTEM

(71) Applicant: MARS SEMICONDUCTOR CORP., Hsinchu (TW)

(72) Inventors: Luen-Shen Yuan, Hsinchu (TW); Yi-Shing Chang, Hsinchu (TW)

(73) Assignee: MARS SEMICONDUCTOR CORP., Hsinchu (TW)

( * ) Notice: Subject to any disclaimer, the term of this patent is extended or adjusted under 35 U.S.C. 154(b) by 308 days.

(21) Appl. No.: 18/153,271

(22) Filed: Jan. 11, 2023

(65) Prior Publication Data
US 2024/0231745 A1    Jul. 11, 2024

(51) Int. Cl.
G06F 3/16       (2006.01)
G06F 13/40      (2006.01)
G06F 13/42      (2006.01)

(52) U.S. Cl.
CPC ............ *G06F 3/16* (2013.01); *G06F 13/4068* (2013.01); *G06F 13/4282* (2013.01); *G06F 2213/0038* (2013.01)

(58) Field of Classification Search
CPC .... G06F 3/16; G06F 13/4068; G06F 13/4282; G06F 2213/0038
See application file for complete search history.

(56) References Cited

U.S. PATENT DOCUMENTS

| | | | | |
|---|---|---|---|---|
| 11,650,625 | B1 * | 5/2023 | Grajewski | G10L 25/78 700/1 |
| 11,836,103 | B1 * | 12/2023 | Nakibly | G06F 13/4221 |
| 2023/0081012 | A1 * | 3/2023 | Hwang | H04W 12/02 726/26 |

* cited by examiner

*Primary Examiner* — Fan S Tsang
*Assistant Examiner* — David Siegel
(74) *Attorney, Agent, or Firm* — MUNCY, GEISSLER, OLDS & LOWE, P.C.

(57) ABSTRACT

A system on chip (SOC) module has a first SOC for audio data transmission, and the first SOC has an audio data input/output (I/O) interface unit, a processing unit and a serial peripheral interface (SPI) unit. The audio data I/O interface unit is electrically connected to multiple audio input devices so as to receive multiple pieces of first audio data generated by the multiple audio input devices. The processing unit is used to store the multiple pieces of the first audio data. The SPI unit is electrically connected to a second SOC via a first SPI, so as to transmit the multiple pieces of the first audio data to the second SPI.

12 Claims, 6 Drawing Sheets

SOC MODULE FOR AUDIO DATA TRANSMISSION AND AUDIO TRANSMISSION SYSTEM

TECHNICAL FIELD

The present disclosure relates a system on chip (SOC) module for audio data transmission and an audio data transmission system, and in particular to, a SOC module which has two SOCs utilizing a serial peripheral interface (SPI) to perform audio data transmission and an audio data transmission system having the SOC module.

RELATED ART

The existing SOC used as a slave device for SPI only electrically connects an audio input device (for example, a microphone) and an audio output device (for example, a speaker), but based on the situation that existing process technology is growth and chip processing capability is getting stronger and stronger, if the SOC as the slave device is only electrically connected to an audio input device and an audio output device, it will not only waste the computing power of the SOC, but also will not meet the current expectation of using multiple pieces of audio data of multiple audio input devices to enhance the audio quality requirements (p.s., the current practice is to electrically connect multiple slave devices of the multiple audio input devices to a master device to meet the requirement of enhancing audio quality by using the multiple pieces of the audio data). Therefore, it is necessary to provide a solution in which multiple SOCs in the SOC module can communicate through SPI and one of the SOCs can be electrically connected to multiple audio input devices at the same time.

SUMMARY

According to one objective of the present disclosure, the present disclosure provides a SOC module comprising a first SOC for audio data transmission. The first SOC comprises an audio data input/output (I/O) interface unit, a processing unit and a serial peripheral interface (SPI) unit. The audio data I/O interface unit is electrically connected to multiple audio input devices, so as to receive multiple pieces of first audio data generated by the multiple audio input devices. The processing unit is electrically connected to the audio data I/O interface unit, and used to store the multiple pieces of the first audio data. The SPI unit is electrically connected to the processing unit, and electrically connected to a second SOC via a first SPI, so as to transmit the multiple pieces of the first audio data to the second SOC.

According to one objective of the present disclosure, the present disclosure provides an audio data transmission system comprising an audio data transmitting module and a first audio data receiving module. The audio data transmitting module comprises a first SOC, a second SOC, a first radio frequency (RF) module and multiple first audio input devices, wherein the first SOC is electrically connected to the second SOC via a first SPI, the first SOC is electrically connected to the multiple first audio input devices, the second SOC is electrically connected to the first RF module, the first SOC acquires multiple pieces of first audio data generated by the multiple first audio input devices, the first SOC transmits the multiple pieces of the first audio data to the second SOC via the first SPI, and the second SOC transmits the received multiple pieces of the first audio data to the first RF module, so as to perform transmission of the multiple pieces of the first audio data. The first audio data receiving module comprises a second RF module, a third SOC, a fourth SOC and multiple second audio input devices, wherein the third SOC is electrically connected to the fourth SOC via a second SPI, the third SOC is electrically connected to the multiple second audio input devices, so as to receive multiple pieces of second audio data generated by the multiple second audio input devices, the fourth SOC is electrically connected to the second RF module, the second RF module receives the multiple pieces of the first audio data transmitted by the first RF module, the fourth SOC is used to receive the multiple pieces of the first audio data transmitted by the second RF module, the fourth SPC transmits the multiple pieces of the first audio data to the third SOC via the second SPI, and the third SOC is further electrically connected to a first terminal device or at least one of multiple audio output devices.

In short, through the design of the SOC module, the SOC electrically connected to the multiple audio input devices in the SOC module can be electrically connected to at least one other SOC through the SPI, and the SPI has a configuration design of a master device and a slave device, such that the multiple pieces of the audio data can be effectively transmitted between the multiple SOCs, and it reduces the waste of computing power and the increase of circuit area and cost caused by the previous practice of configuring one SOC for each audio data input device.

BRIEF DESCRIPTIONS OF DRAWINGS

DETAILS OF EXEMPLARY EMBODIMENTS

Figure 1:
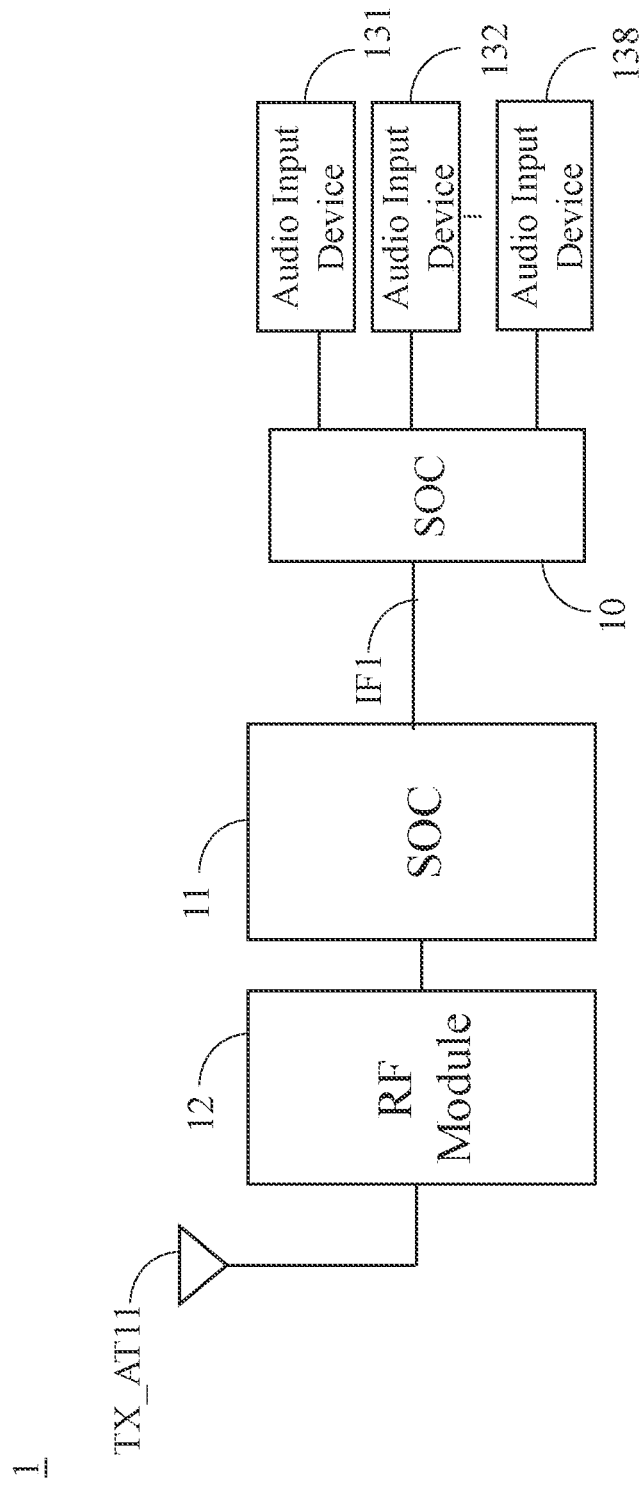
FIG. 1 is a schematic block diagram showing a SOC module acted as a transmitter of an audio data transmission system according to an embodiment of the present disclosure.

Firstly, refer to FIG. 1, and FIG. 1 is a schematic block diagram showing a SOC module acted as a transmitter of an audio data transmission system according to an embodiment of the present disclosure. The SOC module 1 in the embodiment is acted as a transmitter of the audio data transmission system, and that is, the SOC module 1 is an audio data transmitting module. The SOC module 1 comprises multiple SOCs 10, 11, a RF module 12 and multiple audio input devices 131 through 138. The SOC 10 is electrically connected to the SOC 11 via a SPI IF1. The SOC 10 is electrically connected to the multiple audio input devices 131 through 138, and the SOC 11 is electrically connected to the RF module 12. The SOC 10 acquires multiple pieces of audio data generated by the multiple audio input devices 131 through 138, the SOC 10 transmits the multiple pieces of the audio data generated by the multiple audio input devices 131 through 138 to the SOC 11 via the SPI IF1. The SOC 11 then transmits the received multiple pieces of the audio data to the RF module 12, so as to perform transmission of the multiple pieces of the audio data.

Specifically, the RF module 12 is electrically connected to the transmitting antenna TX_AT11. The RF module 12 can transmits the multiple pieces of the audio data outside the SOC module 1 via the transmitting antenna TX_AT11, and for example, the RF module 12 can use a RF wave of a frequency of 2.4 GHz to transmit the multiple pieces of the audio data. In addition, SOC module 1 can be a wireless microphone array module, and for example, it can be acted as a sound sensor module in a factory, a medical facility or a recording studio room. Further, the transmitting antenna TX_AT11 of the SOC module 1 can be an external antenna separated from the SOC module 1 or an internal antenna integrated in the SOC module 1. Furthermore, the RF module 12 in the embodiment though is an component independent to the SOC 11, the present disclosure is not limited thereto, and in one implementation, the RF module 12 is integrated in the SOC 11. Moreover, the multiple audio input devices 131 through 138 can be multiple microphones or multiple audio data storage devices of different channels. The multiple audio input devices 131 through 138 can be integrated in the SOC module 1, and can be multiple external audio input devices externally connected to the SOC module 1.

Figure 5:
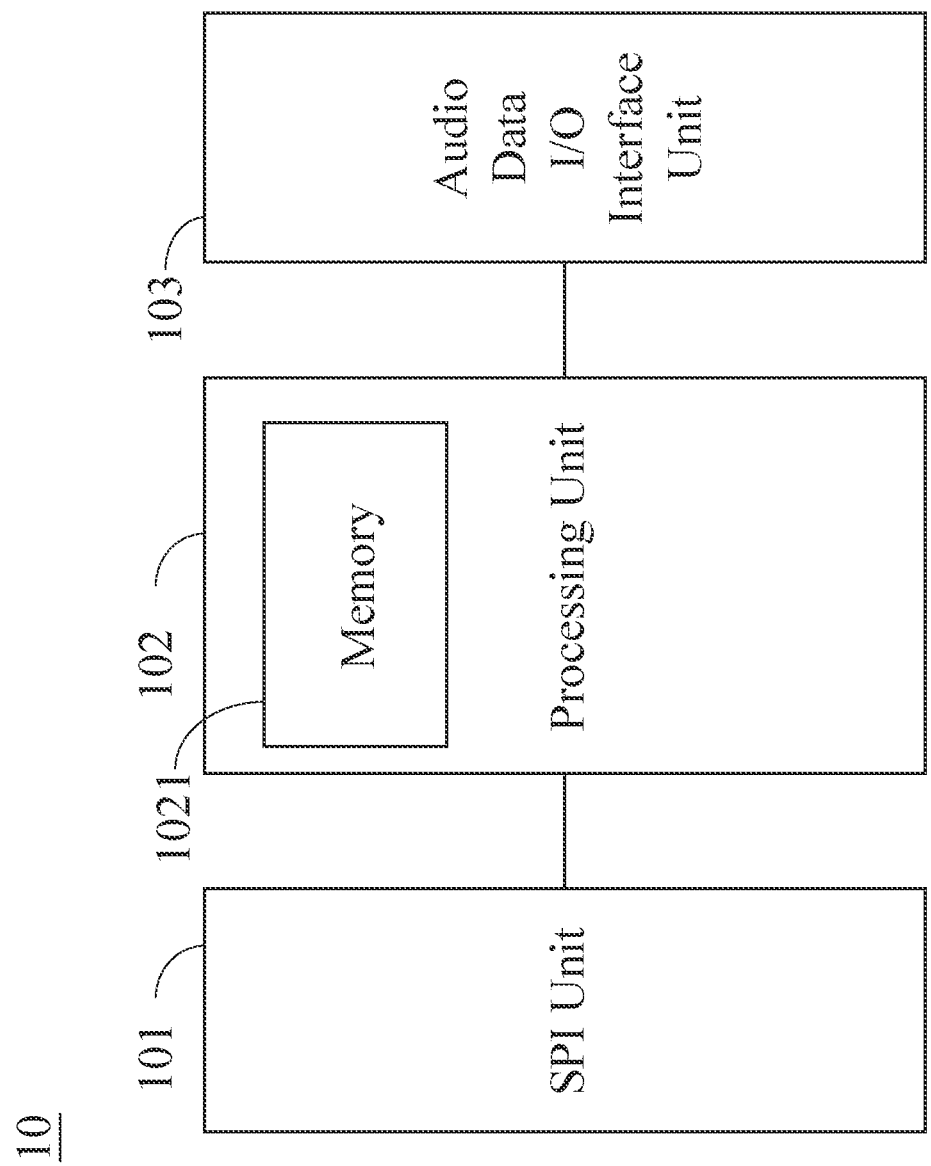
FIG. 5 is schematic block diagram showing a SOC for audio data transmission according to one embodiment of the present disclosure.

Refer to FIG. 1 and FIG. 5 at the same time, and FIG. 5 is schematic block diagram showing a SOC for audio data transmission according to one embodiment of the present disclosure. The SOC 10 at least comprises an audio data I/O interface unit 103, a processing unit 102 and a SPI unit 101. The audio data I/O interface unit 103 is electrically connect the multiple audio input devices 131 through 138 at the same time to receive the multiple pieces of the audio data generated by the multiple audio input devices 131 through 138. For example, the audio data I/O interface unit 103 can be an 8 to 1 audio port device which ports can be universal serial bus (USB) ports or 3.5 mm microphone ports, and the present disclosure is not limited thereto. The processing unit 102 is electrically connected to the audio data I/O interface unit 103, and comprises a memory 1021, wherein the memory is used to store the multiple pieces of the audio data generated by the multiple audio input devices 131 through 138, wherein the memory 1021 is, for example, a ping-pong memory, and the present disclosure is not limited thereto. The processing unit 102 can be for example a microcontroller unit (MCU), a central processing unit or a specifically designed control circuit, and the present disclosure is not limited thereto. Furthermore, the memory 1021 can usually be a cache memory, but the present disclosure is not limited thereto. The SPI unit 100 is electrically connected to the processing unit 102, and further electrically connected to the SOC 11 to be acted as a master device (that is, the SOC 10 is acted as a slave device), so as to transmit the multiple pieces of the audio data from the multiple audio input devices 131 through 138 to the SOC 11. The SPI unit 100 can be for example a connection interface bus device with a SPI bus to electrically connect the SOCs 11 and 10, and the present disclosure is not limited thereto.

Specifically, after the SOC 11 receives an interruption of data requesting transmitted by the SOC 10, the SOC 10 and 11 perform the audio data transmission via the SPI IF1. The multiple pieces of the audio data is combined into a frame by the processing unit 102, and the SPI unit 101 transmits the frame to the SOC 11. Further, the internal structure of the SOC 11 is the same as that of the SOC 10 in FIG. 5, the repeated descriptions are omitted, and the present disclosure is not limited thereto.

Figure 2:
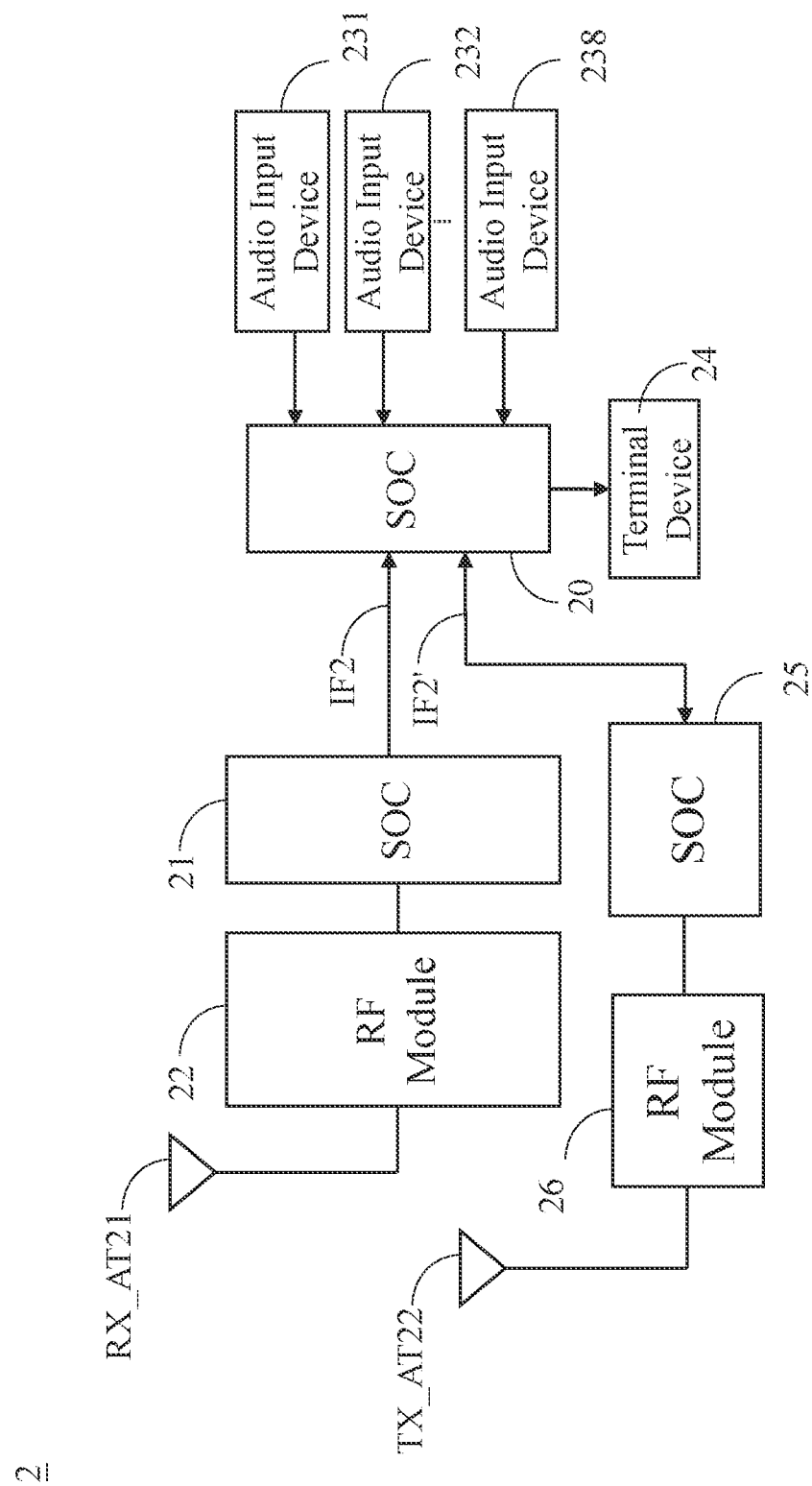
FIG. 2 is schematic block diagram showing a SOC module acted as a receiver of an audio data transmission system according to an embodiment of the present disclosure.

Refer to FIG. 2, and FIG. 2 is schematic block diagram showing a SOC module acted as a receiver of an audio data transmission system according to an embodiment of the present disclosure. The SOC module 2 is acted as a receiver of the audio data transmission system, and that is the SOC module 2 is an audio data receiving module, and comprises multiple SOCs 20, 21, 25, multiple RF modules 22, 26 and multiple audio input devices 231 through 238. The SOC 20 is electrically connected to the SOC 21 via a SPI IF2, and the SOC 20 is electrically connected to the SOC 25 via a SPI IF2'. The SOC 20 is electrically connected to the multiple audio input devices 231 through 238, the SOC 21 is electrically connected to the RF module 22. The RF module 22 is electrically connected to the receiving antenna RX_AT21. The RF module 22 receives the multiple pieces of the audio data transmitted by the RF module 12 of FIG. 1 via the receiving antenna RX_AT21, and the RF module 22 transmits the received multiple pieces of the audio data to the SOC 21. The RF module 22 and the RF module 12 use the RF waves with the same frequency for wireless data transmission, for example, 2.4 GHz.

In this embodiment, the SOC 20 is used as a master device, and the SOCs 21 and 25 are used as slave devices. When the SOC 21 intends to transmit the multiple pieces of the audio data which are received by the RF module 22, the SOC 21 sends an interruption of data requesting to the SOC 20. After the SOC 20 receives the interruption, the SOC 21 can transmit the multiple pieces of the audio data received by the RF module 22 via the SPI IF2 to the SOC 20. The SOC 20 can obtain the multiple pieces of the audio data generated by the multiple audio input devices 231 through 238, and the SOC 20 can transmit the multiple pieces of the audio data generated by the multiple audio input devices 231 through 238 and/or the multiple pieces of the audio data received by the RF module 22 to SOC 25 via the SPI IF2'.

The SOC 25 can transmit the received multiple pieces of the audio data to the RF module 26, so as to perform transmission of the multiple pieces of the audio data. The SOC 25 can also transmit the received multiple pieces of the audio data to the terminal device 24 which electrically connected to the SOC 25. The terminal device 24 can be, for example, a desktop computer, a notebook, a computer stick, a smartphone, a pad, a wearable device or a smart home appliance (such as a smart television), and the present invention is not limited thereto. The SOC 25 and the terminal device 24 can be electrically connected to each other via a general-purpose serial bus, and the present disclosure is not limited thereto. Therefore, when the SOC 25 transmits the received multiple pieces of the audio data to the terminal device 24 which electrically connected to the SOC 25, the SOC 25 will first perform data format conversion on the multiple pieces of the audio data, and then transmit multiple pieces of the audio data being converted in data format to the terminal device 24, and the data conversion can be for example that the multiple pieces of the audio data in SPI format is converted to the multiple pieces of the audio data in USB format.

The RF module 26 is electrically connected to the transmitting antenna TX_AT22, and transmits the received multiple pieces of the audio data via the transmitting antenna TX_AT22. A frequency used for data transmission by the RF module 26 is different from the frequency used by the RF modules 22 and 12 for data transmission. The frequency used by the RF module 26 for data transmission is, for example, 5.8 GHz, and the present disclosure is not limited thereto. The multiple audio input devices 231 through 238 are multiple microphones or multiple audio data storage devices of difference channel, and the present disclosure is not limited thereto. The multiple audio input devices 231 through 238 may be components independent to the SOC module 2, or integrated components in the SOC module 2, and the present disclosure is not limited thereto. The terminal device 24 can also be one of the components of the SOC module 2, for example, when the terminal device 24 is a computer stick, and the present disclosure is not limited thereto. In the example of FIG. 2, the SOC module 2 is the audio data receiving module, but when it further has a RF module 26, it has the function that the multiple pieces of the audio data can be sent out outside the SOC module 2, therefore the SOC module 2 as acted as audio data receiving module is essentially the audio data receiving module 2 with audio data relay function.

Figure 3:
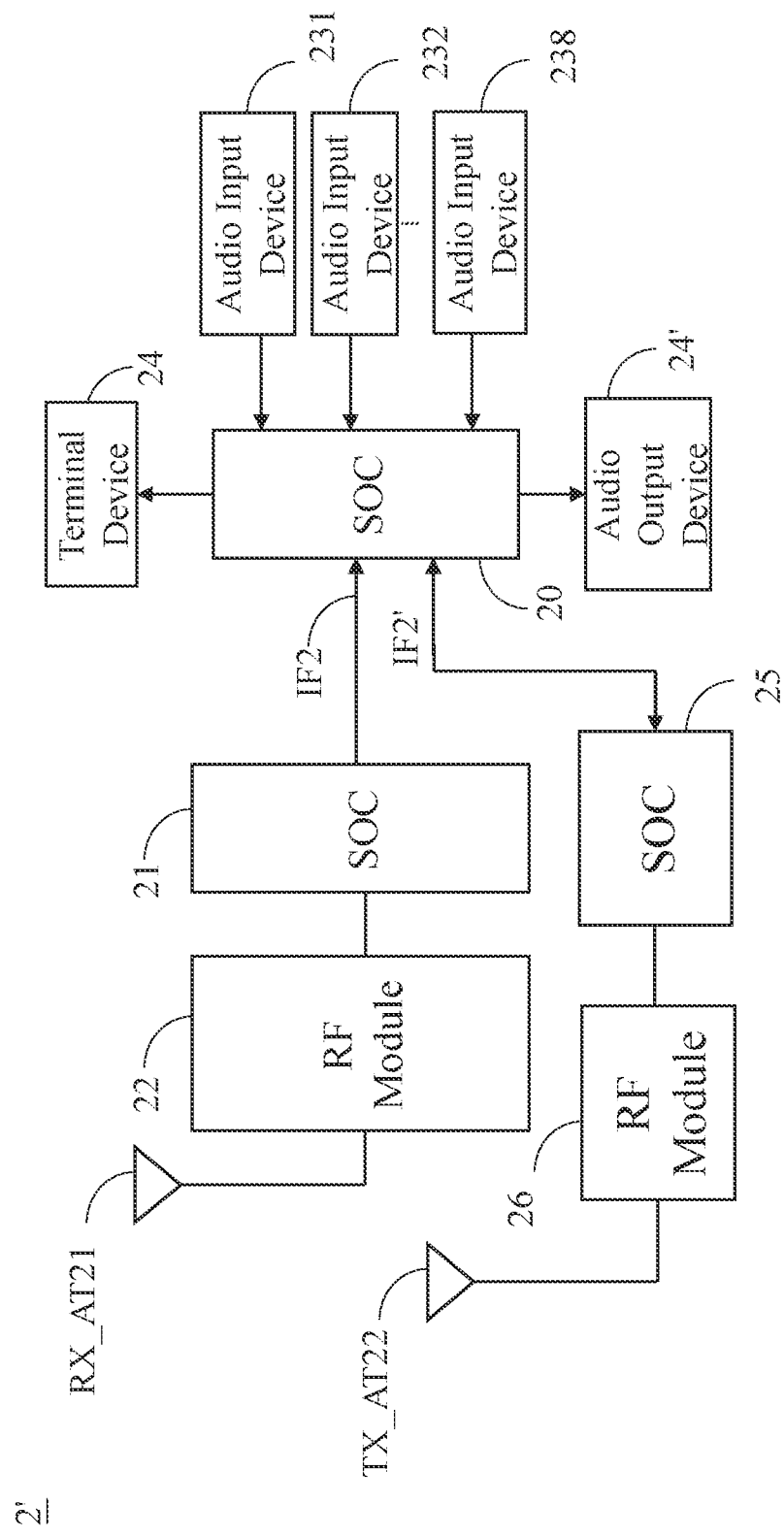
FIG. 3 is schematic block diagram showing a SOC module acted as a receiver of an audio data transmission system according to another one embodiment of the present disclosure.
Figure 4:
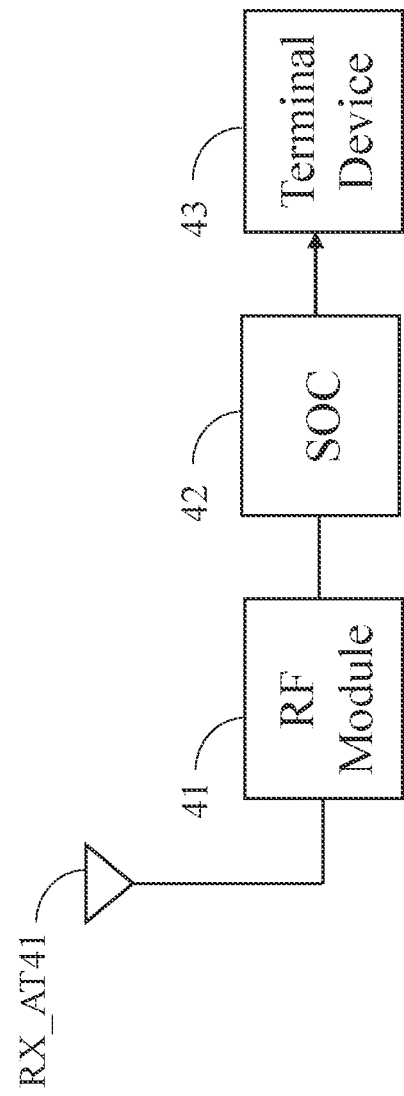
FIG. 4 is schematic block diagram showing a SOC module acted as a receiver of an audio data transmission system according to another one embodiment of the present disclosure.

Refer to FIG. 3, and FIG. 3 is schematic block diagram showing a SOC module acted as a receiver of an audio data transmission system according to another one embodiment of the present disclosure. Being different from the embodiment of FIG. 2, the SOC 20 of the SOC module 2' is further connected to at least one of multiple audio output devices 24'. The audio output device 24' can be a speaker, an earphone or an audio data storage device. The audio output device 24' can be one part integrated in the SOC module 2'. The audio output device 24' receives the multiple pieces of the audio data transmitted by the SOC 20, and outputs the received multiple pieces of the audio data. Refer to FIG. 3 and FIG. 5, and the SOC 20 can have components similar to those of SOC 10 in FIG. 5. The SPI unit of the SOC 20 can transmit the received multiple pieces of the audio data to the processing unit of the SOC 20, and the processing unit of the SOC 20 then transmits the multiple pieces of the audio data to the audio output device 24' via the audio data I/O interface unit of the SOC 20. The audio output device 24' thus outputs or plays the received multiple pieces of the audio data. By the way, some application scenarios of the present disclosure can be used for recording and playback in a recording studio room, or can be used for mixing and tuning in a post-production mixing room Next, refer to FIG. 4, and FIG. 4 is schematic block diagram showing a SOC module acted as a receiver of an audio data transmission system according to another one embodiment of the present disclosure. The SOC module 4 is an audio data receiving module, and comprises a RF module 41, a SOC 42 and a terminal device 43. The SOC 42 is electrically connected to the terminal device 43 and the RF module 41, and the RF module 41 is electrically connected to the receiving antenna RX_AT41, and the RF module 41 receives the multiple pieces of the audio data transmitted by the RF module 12 and/or the RF module 26 via the receiving antenna RX_AT41, wherein the frequency used by the RF module 41 for wireless data transmission is the same as the frequency used by the RF module 26 or wireless data transmission. For example, the frequency used by the RF module 41 to receive data is, for example, 5.8 GHz. The RF module 41 sends the received multiple pieces of the audio data to the SOC 42, and the SOC 42 sends the received multiple pieces of the audio data to the terminal device 43.

Incidentally, the above-mentioned SOCs 10, 11, 20, 21, 25 and 42 etc. can perform noise filtering, gain adjustment or format conversion processing on the audio data, and the present disclosure is not limited thereto. The terminal device 43 can also be a desktop computer, a notebook, a computer stick, a smartphone, a pad, a wearable device or a smart home appliance, and the present disclosure is not limited thereto. Furthermore, the terminal device 43 and the receiving antenna RX_AT41 may also be part of the SOC module 4, or be independent to the SOC module 4, and the present disclosure is not limited thereto.

In addition, in the embodiment of the present disclosure, an audio data transmission system is also provided, the audio data transmission system at least comprises the SOC module 1 of FIG. 1 acted as the audio data transmitting module and the SOC module 2 or 2' in FIG. 2 or FIG. 3 acted as the audio data receiving module, and the audio data transmission system may further comprise the SOC module 4 shown in FIG. 4 acted as the audio data receiving module.

Figure 6:
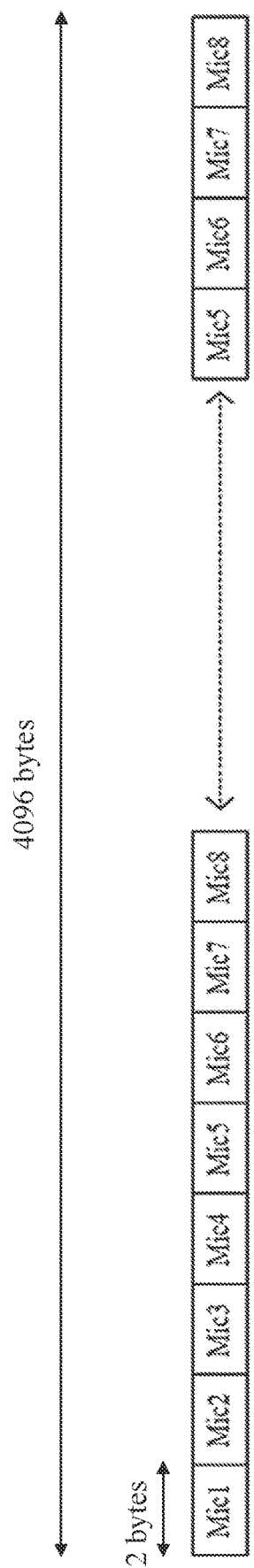
FIG. 6 is a schematic diagram showing a frame of multiple pieces of audio data of audio data transmission according to one embodiment of the present disclosure.

Refer to FIG. 1, FIG. 5 and FIG. 6, and FIG. 6 is a schematic diagram showing a frame of multiple pieces of audio data of audio data transmission according to one embodiment of the present disclosure. After the SOC 11 receives the interruption of data requesting sent by the SOC 10, the SOC 11 and SOC 10 conduct the audio data transmission via the SPI IF1, and multiple pieces Mic1 through Mic8 of the audio data of the multiple audio input devices 131 through 138 will be processed by the processing unit 102 to be combined to form a frame, and the SPI unit 101 sends the frame to the SOC 11. Further, the size of each of the multiple pieces Mic1 through Mic8 of the audio data is 2 bytes, and for each of the multiple audio input devices 131 through 138, each 256 pieces Mic1 through Mic8 of the audio data are sampled in one frame, so the frame size is 4096 bytes.

As can be seen from the above descriptions, by using the design of electrically connecting the multiple audio input devices to the SOC and electrically connecting the SOC with another one SOC via the SPI, the present disclosure can effectively use the storage space and computing power of the SOC to store the multiple pieces of the audio data and to transmit the multiple pieces of the audio data form the SOC to the other one SOC. In this way, in addition to not wasting the computing power and storage space of the SOC, this approach is more in line with the current desire to use the multiple pieces of the audio data of the multiple audio input devices to enhance the audio quality.

While the present disclosure has been described by way of example and in terms of exemplary embodiment, it is to be understood that the present disclosure is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A system on chip (SOC) module, comprising a first SOC for audio data transmission, and the first SOC comprises:
    an audio data input/output (I/O) interface unit, electrically connected to multiple audio input devices, so as to receive multiple pieces of first audio data generated by the multiple audio input devices;
    a processing unit, electrically connected to the audio data I/O interface unit, used to store the multiple pieces of the first audio data;
    a serial peripheral interface (SPI) unit, electrically connected to the processing unit, and electrically connected to a second SOC via a first SPI, so as to transmit the multiple pieces of the first audio data to the second SOC;

the multiple audio input devices;

the second SOC; and a first radio frequency (RF) module, electrically connected to the second SOC, wherein the SOC module is an audio data receiving module and the SOC module further comprises:

a third SOC, electrically connected to the SPI unit of the first SOC via a second SPI; and a second RF module, electrically connected to the third SOC, and wherein the first SOC is further electrically connected to a terminal device or at least one of multiple audio output devices.

2. The SOC module of claim 1, further comprising the at least one of the multiple audio output devices, wherein the at least one of the multiple audio output devices receives the multiple pieces of the first audio data from the first SOC and outputs the multiple pieces of the first audio data.

3. The SOC module of claim 2, wherein the SPI unit transmits the multiple pieces of the first audio data to the processing unit, and the processing unit transmits the multiple pieces of the first audio data to the at least one of the multiple audio output devices via the audio data I/O interface unit.

4. The SOC module of claim 1, wherein after the second SOC receives an interruption for requesting data transmitted by the first SOC, the first SOC and the second SOC performs the audio data transmission via the first SPI, wherein the multiple pieces of the first audio data is combined into a frame by the processing unit, and the SPI unit transmits the frame to second SOC via the first SPI.

5. The SOC module of claim 1, wherein the multiple audio input devices are multiple microphones or multiple first audio data storage devices, and the at least one of the multiple audio output devices is a speaker, an earphone or a second audio data storage device.

6. The SOC module of claim 1, wherein the terminal device is a desktop computer, a notebook, a computer stick, a smartphone, a pad, a wearable device or a smart home appliance.

7. An audio data transmission system, comprising:

an audio data transmitting module, comprising a first system on chip (SOC), a second SOC, a first radio frequency (RF) module and multiple first audio input devices, wherein the first SOC is electrically connected to the second SOC via a first serial peripheral interface (SPI), the first SOC is electrically connected to the multiple first audio input devices, the second SOC is electrically connected to the first RF module, the first SOC acquires multiple pieces of first audio data generated by the multiple first audio input devices, the first SOC transmits the multiple pieces of the first audio data to the second SOC via the first SPI, the second SOC transmits the received multiple pieces of the first audio data to the first RF module, so as to perform transmission of the multiple pieces of the first audio data; and a first audio data receiving module, comprising a second RF module, a third SOC, a fourth SOC and multiple second audio input devices, wherein the third SOC is electrically connected to the fourth SOC via a second SPI, the third SOC is electrically connected to the multiple second audio input devices, so as to receive multiple pieces of second audio data generated by the multiple second audio input devices, the fourth SOC is electrically connected to the second RF module, the second RF module receives the multiple pieces of the first audio data transmitted by the first RF module, the fourth SOC is used to receive the multiple pieces of the first audio data transmitted by the second RF module, the fourth SPC transmits the multiple pieces of the first audio data to the third SOC via the second SPI, and the third SOC is further electrically connected to a first terminal device or at least one of multiple audio output devices.

8. The audio data transmission system of claim 7, wherein the first audio data receiving module further comprises a fifth SOC and a third RF module, the fifth SOC is electrically connected to the third SOC via a third SPI, the third RF module is electrically connected to the fifth SOC, the fifth SOC receives the multiple pieces of the first audio data and/or the multiple pieces of the second audio data transmitted by the third SOC via the third SPI, the fifth SOC transmits the multiple pieces of the first audio data and/or the multiple pieces of the second audio data to the third RF module, and the third RF module is used to transmit the multiple pieces of the first audio data and/or the multiple pieces of the second audio data.

9. The audio data transmission system of claim 8, further comprising:

a second audio data receiving module, comprising a fourth RF module and a sixth SOC, wherein the fourth RF module and the sixth SOC are electrically connected to each other, the fourth RF module is used to receive the multiple pieces of the first audio data and/or the multiple pieces of the second audio data transmitted by the third RF module, and transmit the multiple pieces of the first audio data and/or the multiple pieces of the second audio data to the sixth SOC, and the sixth SOC transmits the multiple pieces of the first audio data and/or the multiple pieces of the second audio data to a second terminal device which is electrically connected to the sixth SOC.

10. The audio data transmission system of claim 7, wherein the first SOC combines the multiple pieces of the first audio data into a frame, and transmit the frame to the second SOC via the first SPI.

11. The audio data transmission system of claim 7, wherein the multiple first and second audio input devices are multiple microphones or multiple first audio data storage devices, and the at least one of the multiple audio output devices is a speaker, an earphone or a second audio data storage device.

12. The audio data transmission system of claim 9, wherein each of the first terminal device and the second terminal device is a desktop computer, a notebook, a computer stick, a smartphone, a pad, a wearable device or a smart home appliance.

* * * * *